United States Patent
Feng

(10) Patent No.: US 10,122,972 B2
(45) Date of Patent: *Nov. 6, 2018

(54) SYSTEM AND METHOD FOR LOCALIZING A TALKER USING AUDIO AND VIDEO INFORMATION

(71) Applicant: Polycom, Inc., San Jose, CA (US)

(72) Inventor: Jinwei Feng, Woburn, MA (US)

(73) Assignee: Polycom, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/808,665

(22) Filed: Nov. 9, 2017

(65) Prior Publication Data

US 2018/0070053 A1    Mar. 8, 2018

Related U.S. Application Data

(63) Continuation of application No. 15/369,576, filed on Dec. 5, 2016, now Pat. No. 9,912,908, which is a continuation of application No. 14/943,667, filed on Nov. 17, 2015, now Pat. No. 9,542,603.

(60) Provisional application No. 62/080,860, filed on Nov. 17, 2014.

(51) Int. Cl.
| | |
|---|---|
| H04N 7/15 | (2006.01) |
| G06K 9/00 | (2006.01) |
| G06K 9/52 | (2006.01) |
| H04N 7/14 | (2006.01) |
| G06T 7/20 | (2017.01) |
| H04R 1/40 | (2006.01) |

(52) U.S. Cl.
CPC ........... *H04N 7/15* (2013.01); *G06K 9/00228* (2013.01); *G06K 9/00718* (2013.01); *G06K 9/52* (2013.01); *G06T 7/20* (2013.01); *H04N 7/142* (2013.01); *H04R 1/406* (2013.01); *G06T 2207/10016* (2013.01)

(58) Field of Classification Search
None
See application file for complete search history.

(56) References Cited

U.S. PATENT DOCUMENTS

| | | |
|---|---|---|
| 4,538,297 A | 8/1985 | Waller, Jr. |
| 6,795,106 B1 | 9/2004 | Cooper |
| 6,980,485 B2 | 12/2005 | McCaskill |
| 8,248,448 B2 | 8/2012 | Feng et al. |
| 8,395,653 B2 | 3/2013 | Woo |
| 8,675,890 B2 | 3/2014 | Schmidt et al. |
| 2001/0028719 A1 | 10/2001 | Hayashi |

(Continued)

*Primary Examiner* — Creighton Smith
(74) *Attorney, Agent, or Firm* — Blank Rome, LLP

(57) ABSTRACT

A videoconferencing endpoint includes at least one processor a number of microphones and at least one camera. The endpoint can receive audio information and visual motion information during a teleconferencing session. The audio information includes one or more angles with respect to the microphone from a location of a teleconferencing session. The system evaluates the audio information is evaluated to determine at least one candidate angle corresponding to a possible location of an active talker. The candidate angle can be analyzed further with respect to the motion information to determine whether the candidate angle correctly corresponds to person who is speaking during the teleconferencing session. The person's face can then be framed within a frame view.

19 Claims, 9 Drawing Sheets

(56) References Cited

U.S. PATENT DOCUMENTS

| | | |
|---|---|---|
| 2005/0122067 A1 | 6/2005 | Lee |
| 2006/0053459 A1 | 3/2006 | Simerly |
| 2011/0096915 A1 | 4/2011 | Nemer |
| 2013/0307919 A1* | 11/2013 | Taubin .................. H04N 7/15 348/14.02 |
| 2015/0163454 A1 | 6/2015 | Smith et al. |
| 2015/0221319 A1 | 8/2015 | Cartwright et al. |
| 2015/0341719 A1 | 11/2015 | Sun |
| 2016/0080867 A1 | 3/2016 | Nugent |
| 2017/0045814 A1 | 2/2017 | Geerds |

\* cited by examiner

600

SYSTEM AND METHOD FOR LOCALIZING A TALKER USING AUDIO AND VIDEO INFORMATION

CROSS-REFERENCE TO RELATED APPLICATION

This application is a continuation of U.S. application Ser. No. 15/369,576 filed Dec. 5, 2017, which is a continuation of U.S. application Ser. No. 14/943,667 filed Nov. 17, 2015, now U.S. Pat. No. 9,542,603, which claims priority benefit of U.S. Provisional Application No. 62/080,860 filed Nov. 17, 2014, the contents of all of which are incorporated herein by reference.

FIELD OF THE DISCLOSURE

This disclosure relates to video-conferencing and in particular to localization of an active talker during a videoconference.

BACKGROUND

Videoconferences can involve transmission of video and audio information between two or more videoconference locations. It can be desirable to display prominently a person who is currently talking at a first location to participants who are at different locations. Such a currently talking person can be called an "active talker." Before an active talker can be displayed more prominently than listeners, the position of the active talker needs to be localized. Solutions to this and related issues can be found in U.S. Pat. No. 6,980,485, U.S. Pat. No. 8,248,448 and U.S. Pat. No. 8,395,653, the contents of which are fully incorporated by reference herein. Most solutions use only audio information to localize an active talker. However, such solutions can often be less accurate and more cumbersome than is desirable. Thus, there is room for improvement in the art.

SUMMARY

Methods, devices and techniques of accurately and efficiently locating a person speaking during a teleconference are disclosed. In one embodiment, audio information and motion information are collected during a teleconferencing session. The audio information is analyzed, and based on the analysis, one or more angles (usually corresponding to the direct path and reflection path) are determined to be likely sources of human speech. The accuracy of locating the active talker is enhanced by employing a unique algorithm, which involves giving certain lower frequencies greater weight within a frequency band. These likely sources, or "candidate angles," are ranked according to their likelihood of being accurate, using methods and algorithms described herein. Motion information is analyzed with regard to the strongest candidate angle. If motion is detected at the candidate angle, there is a strong likelihood that the candidate angle is the "true angle," meaning that it corresponds to the mouth/head of an active talker. If there is no motion detected at the strongest candidate angle, it usually indicates the strongest candidate corresponds to the wall reflection, and so the second strongest angle is then processed likewise, and so on until the fourth one.

Once the active talker has been accurately localized, he or she can be displayed in high definition in an active talker view. It will be noted that through methods and algorithms set forth herein, the tasks of localization and displaying of an active talker can be achieved with fewer cameras and less computational resources than have been required in earlier solutions. These and other aspects of the disclosure will be apparent in view of the attached figures and detailed description.

The foregoing summary is not intended to summarize each potential embodiment or every aspect of the present disclosure, and other features and advantages of the present disclosure will become apparent upon reading the following detailed description of the embodiments with the accompanying drawings and appended claims. Although specific embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF THE DRAWINGS

Embodiments of the present invention will be understood and appreciated more fully from the following detailed description, taken in conjunction with the drawings in which:

FIGS. 2B-2D show alternate configurations for the videoconferencing device;

DETAILED DESCRIPTION

Figure 1A:
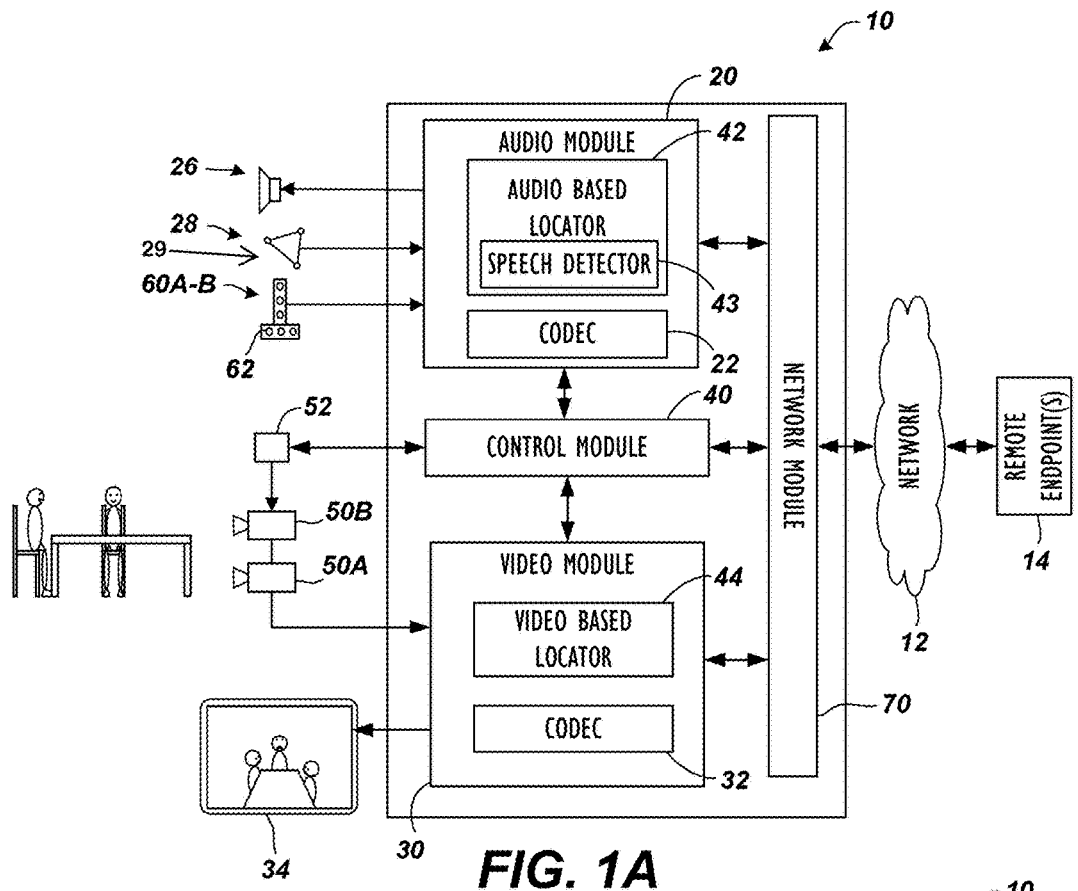
FIG. 1A illustrates a videoconferencing endpoint according to certain teachings of the present disclosure.

At least one embodiment of this disclosure is a videoconferencing endpoint which includes a processor, a predetermined number of microphones and at least one camera, coupled to (in signal communication with) a non-transitory computer readable storage medium which is also coupled to the processor. The videoconferencing endpoint can further include at least one program module, which is stored on the storage medium. The videoconferencing endpoint can receive audio information through the microphones during a teleconferencing session (under control of the processor). The audio information can correspond to one or more angles formed between an angle of direction from an audio source (such as a person speaking) and the microphones. The audio information can be analyzed according to at least one algorithm to determine one or more candidate angles, corresponding possible locations of a person who is speaking. The one or more candidate angles can be analyzed with reference to motion information received by the camera to the true angle of the active talker with respect to the microphones. In one embodiment, there can be three or more microphones. Alternatively, there can be exactly three microphones. Some or all of the microphones can be arranged in a plane within a base of a teleconferencing device. The camera can be configured to receive visual information in a 360-degree angle of rotation.

In at least one embodiment, determining a candidate angle involves collecting audio from a predetermined number of angles, and lower frequency bands are given greater weight than higher frequency bands from with bands of collected audio signals. Analyzing the candidate angle with respect to received motion can involve determining whether motion has been detected at the candidate angle within the predetermined period. Additionally, analyzing the candidate angle with respect to the received motion can involve determining whether motion has been detected within a predetermined range of the candidate angle. In one embodiment, the predetermined range can be plus or minus ten degrees of the candidate angle, and the predetermined period can be two milliseconds.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware. In the following description, the words "unit," "element," "module" and "logical module" may be used interchangeably. Anything designated as a unit or module may be a standalone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on one or more computer readable media such as a read/write hard disc, CDROM, Flash memory, ROM, or other memory or storage, etc. In order to execute a certain task a software program may be loaded to an appropriate processor as needed. In the present disclosure the terms task, method, and process can be used interchangeably. Both processors and program code for implementing each aspect of the technology can be centralized or distributed (or a combination thereof).

Most methods of localizing speakers use only audio information/data/signals. Audio-only localizers often work well in most common meeting scenarios. However, they often do not work well in others. They can fail, for example, when a person who is speaking is facing away from a teleconferencing device. Various prior art solutions to this problem exist, including the use of greater numbers of microphones, or using machine learning to locate the speaker. These solutions are not optimal because they require large amounts of hardware/equipment and expensive software. They often require a large amount of computational power, and often involve implementation of machine learning, which can take an excess amount of time to function accurately. The figures below and their corresponding descriptions illustrate various improvements over previous solutions.

Turning now to the figures, in which like numerals represent like elements throughout the several views, embodiments of the present disclosure are described. For convenience, only some elements of the same group may be labeled with numerals. The purpose of the drawings is to describe embodiments and not for production. Therefore, features shown in the figures are chosen for convenience and clarity of presentation only. Moreover, the language used in this disclosure has been principally selected for readability and instructional purposes, and may not have been selected to delineate or circumscribe the inventive subject matter, resort to the claims being necessary to determine such inventive subject matter.

Each example is provided by way of explanation of the technology only, not as a limitation of the technology. It will be apparent to those skilled in the art that various modifications and variations can be made in the present technology. For instance, features described as part of one implementation of the technology can be used on another implementation to yield a still further implementation. Thus, it is intended that the present technology cover such modifications and variations that come within the scope of the technology.

A videoconferencing apparatus or endpoint 10 in FIG. 1A communicates with one or more remote endpoints 14 over a network 12. Among some common components, the endpoint 10 has an audio module 20 with an audio codec 22 and has a video module 30 with a video codec 32. These modules 20/30 operatively couple to a control module 40 and a network module 70.

During a videoconference, two or more cameras 50A-B capture video and provide the captured video to the video module 30 and codec 32 for processing. Additionally, one or more microphones 28 (which can be comprised within a pod 29, as shown) capture audio and provide the audio to the audio module 20 and codec 22 for processing. These microphones 28 can be table or ceiling microphones, or they can be part of a microphone pod 29 or the like. The endpoint 10 uses the audio captured with these microphones 28 primarily for the conference audio.

Separately, microphone arrays 60A-B having orthogonally arranged microphones 62 also capture audio and provide the audio to the audio module 22 for processing. Preferably, the microphone arrays 60A-B include both vertically and horizontally arranged microphones 62 for determining locations of audio sources during the videoconference. Therefore, the endpoint 10 uses the audio from these arrays 60A-B primarily for camera tracking purposes and not for conference audio, although their audio could be used for the conference.

After capturing audio and video, the endpoint 10 encodes it using any of the common encoding standards, such as MPEG-1, MPEG-2, MPEG-4, H.261, H.263, H.264, 6.729, and 6.711. Then, the network module 70 outputs the encoded audio and video to the remote endpoints 14 via the network 12 using any appropriate protocol. Similarly, the network module 70 receives conference audio and video via the network 12 from the remote endpoints 14 and sends these to their respective codec 22/32 for processing. Eventually, a loudspeaker 26 outputs conference audio, and a display 34 outputs conference video. Many of these modules and other components can operate in a conventional manner well known in the art so that further details are not provided here.

In the embodiment shown, endpoint 10 uses the two or more cameras 50A-B in an automated and coordinated manner to handle video and views of the videoconference environment dynamically. Other cameras can also be used, in addition to or instead of cameras 50A-B. A first camera 50A can be a fixed or room-view camera, and a second camera 50B can be a controlled or people-view camera. Using the room-view camera 50A, for example, the endpoint 10 captures video of the room or at least a wide or zoomed-out view of the room that would typically include all the videoconference participants as well as some of the surroundings. Although described as fixed, the room-view camera 50A can actually be adjusted by panning, tilting, and zooming to control its view and frame the environment.

By contrast, the endpoint 10 uses the people-view camera 50B to capture video of one or more particular participants, and preferably one or more current speakers (an active talker), in a tight or zoomed-in view. Therefore, the people-view camera 50B is particularly capable of panning, tilting, and zooming. The captured view of a current speaker can be displayed in an active talker window or active talker view or active talker frame. Such a display can be done in high definition to enhance verisimilitude for teleconference participants.

In one arrangement, the people-view camera 50B is a steerable Pan-Tilt-Zoom (PTZ) camera, while the room-view camera 50A is an Electronic Pan-Tilt-Zoom (EPTZ) camera. As such, the people-view camera 50B can be steered, while the room-view camera 50A can be operated electronically to alter its viewing orientation rather than (or in addition to) being steerable. However, the endpoint 10 can use other arrangements and types of cameras. In fact, both cameras 50A-B can be steerable PTZ cameras. Moreover, switching between wide and zoomed views can be shared and alternated between the two steerable cameras 50A-B so that one captures wide views when appropriate while the other captures zoomed-in views and vice-versa.

For ease of understanding, one camera 50A is referred to as a room-view camera, while the other camera 50B is referred to as a people-view camera. Although it may be desirable to alternate between tight views of a speaker and wide views of a room, there may be situations where the endpoint 10 can alternate between two different tight views of the same or different speaker. To do this, it may be desirable to have the two cameras 50A-B both be steerable PTZ cameras as noted previously. In another arrangement, therefore, both the first and second cameras 50A-B can be a controlled or people-view camera, such as steerable PTZ cameras. The endpoint 10 can use each of these cameras 50A-B to capture video of one or more particular participants, and preferably one or more current speakers, in a tight or zoomed-in view as well as providing a wide or zoomed-out view of the room when needed.

In one implementation, the endpoint 10 outputs only video from one of the two cameras 50A-B at any specific time. As the videoconference proceeds, the output video from the endpoint 10 can then switch between the room-view and people-view cameras 50A-B from time to time. In general, the system 10 outputs the video from room-view camera 50A when there is no participant speaking (or operation has degraded), and the endpoint 10 outputs the video from people-view camera 50B when one or more participants are speaking. In one benefit, switching between these camera views allows the far-end of the videoconference to appreciate the zoomed-in views of active speakers while still getting a wide view of the meeting room from time to time.

As an alternative, the endpoint 10 can transmit video from both cameras simultaneously, and the endpoint 10 can let the remote endpoint 14 decide which view to show, especially if the endpoint 10 sends some instructions for selecting one or the other camera view. In yet another alternative, the endpoint 10 can transmit video from both cameras simultaneously so one of the video images can be composited as a picture-in-picture of the other video image. For example, the people-view video from camera 50B can be composited with the room-view from camera 50A to be sent to the far end in a picture-in-picture (PIP) format.

To control the views captured by the two cameras 50A-B, the endpoint 10 uses an audio based locator 42 and a video-based locator 44 to determine locations of participants and frame views of the environment and participants. Locators 42/44 can operate according to methods and algorithms discussed in greater detail below. Then, the control module 40 operatively coupled to the audio and video modules 20/30 uses audio and/or video information from these locators 42/44 to send camera commands to one or both of the cameras 50A-B to alter their orientations and the views they capture. For the people-view camera (or active talker) 50B, these camera commands can be implemented by an actuator or local control unit 52 having motors, servos, and the like that steer the camera 50B mechanically. For the room-view camera 50B, these camera commands can be implemented as electronic signals to be handled by the camera 50B.

To determine which camera 50A-B to use and how to configure its view, the control module 40 uses audio information obtained from the audio-based locator 42 and/or video information obtained from the video-based locator 44. For example and as described in more detail below, the control module 40 uses audio information processed by the audio based locator 42 from the horizontally and vertically arranged microphone arrays 60A-60B. The audio based locator 42 uses a speech detector 43 to detect speech in captured audio from the arrays 60A-60B and then determines a location of a current speaker. The control module 40 using the determined location to then steer the people-view camera 50B toward that location. As also described in more detail below, the control module 40 uses video information processed by the video-based location 44 from the cameras 50A-B to determine the locations of participants, to determine the framing for the views, and to steer the people-view camera 50B at the participants. Locating one or more active talkers can be facilitated by methods and algorithms described herein.

The wide view from the room-view camera 50A can give context to the people-view camera 50B and can be used so that participants at the far-end do not see video from the people-view camera 50B as it moves toward a participant. In addition, the wide view can be displayed at the far-end when multiple participants at the near-end are speaking or when the people-view camera 50B is moving to direct at multiple speakers. Transitions between the two views from the cameras 50A-B can be faded and blended as desired to avoid sharp cut-a-ways when switching between camera views.

As the people-view camera 50B is moved toward the speaker, for example, the moving video from this camera 50B is preferably not transmitted to the far-end of the videoconference. Instead, the video from the room-view camera 50A is transmitted. Once the people-view camera 50B has properly framed the current speaker, however, the endpoint 10 switches between the video from the cameras 50A-B.

All the same, the endpoint 10 preferably does not simply switch automatically to capture views of speakers. Instead, camera changes are preferably timed. Too many camera switches over a period of time can be distracting to the conference participants. Accordingly, the endpoint 10 preferably tracks those speakers using their locations, their voice characteristics, their frequency of speaking, and the like. Then, when one speaker begins speaking, the endpoint 10 can quickly direct the people-view camera 50B at that frequent speaker, but the endpoint 10 can avoid or delay jumping to another speaker who may only be responding with short answers or comments.

Although the endpoint 10 preferably operates without user intervention, the endpoint 10 may allow for user intervention and control. Therefore, camera commands from either one or both of the far and near ends can be used to control the cameras 50A-B. For example, the participants can determine the best wide view to be displayed when no one is speaking. Meanwhile, dynamic camera commands can control the people-view camera 50B as the videoconference proceeds. In this way, the view provided by the people-view camera 50B can be controlled automatically by the endpoint 10.

Figure 1B:
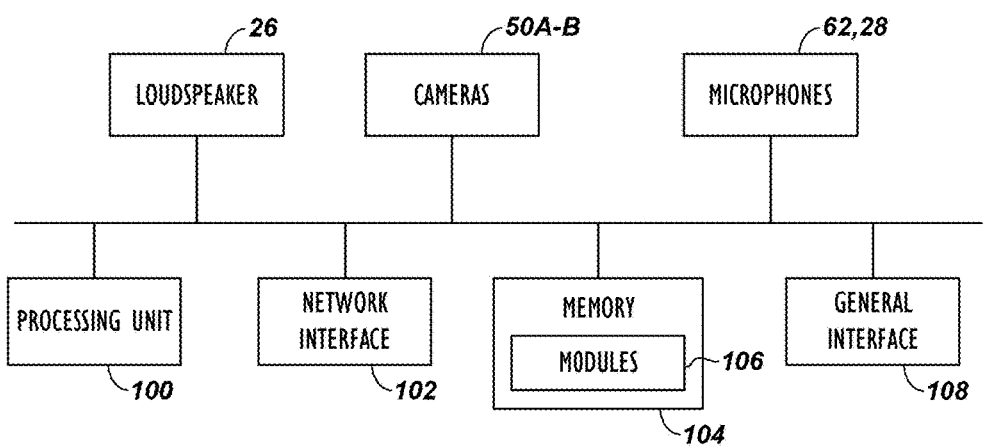
FIG. 1B illustrates components of the videoconferencing endpoint of FIG. 1A.

FIG. 1B shows some exemplary components for the videoconferencing endpoint 10 of FIG. 1A. As shown and discussed above, the endpoint 10 has two or more cameras 50A-B and several microphones 28/62A-B. In addition to these, the endpoint 10 has a processing unit 100, a network interface 102, memory 104, and a general input/output (I/O) interface 108 all coupled via a bus 101.

The memory 104 can be any conventional memory such as SDRAM and can store modules 106 in the form of software and firmware for controlling the endpoint 10. In addition to video and audio codecs and other modules discussed previously, the modules 106 can include operating systems, a graphical user interface (GUI) that enables users to control the endpoint 10, and algorithms for processing audio/video signals and controlling the cameras 50A-B as discussed later.

The network interface 102 provides communications between the endpoint 10 and remote endpoints (not shown). By contrast, the general I/O interface 108 provides data transmission with local devices such as a keyboard, mouse, printer, overhead projector, display, external loudspeakers, additional cameras, microphone pods, etc. The endpoint 10 can also contain an internal loudspeaker 26.

The cameras 50A-B and the microphone arrays 60A-B capture video and audio, respectively, in the videoconference environment and produce video and audio signals transmitted via the bus 101 to the processing unit 100. Here, the processing unit 100 processes the video and audio using algorithms in the modules 106. For example, the endpoint 10 processes the audio captured by the microphones 28/62A-B as well as the video captured by the cameras 50A-B to determine the location of participants and direct the views of the cameras 50A-B. Ultimately, the processed audio and video can be sent to local and remote devices coupled to interfaces 102/108.

Figure 1C:
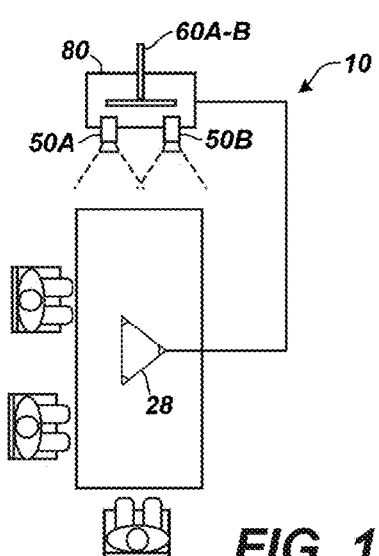
FIGS. 1C-1E show plan views of videoconferencing endpoints.

In the plan view of FIG. 1C, one arrangement of the endpoint 10 uses a videoconferencing device 80 having microphone arrays 60A-B and two cameras 50A-B integrated therewith. A microphone pod 29 can be placed on a table, although other types of microphones, such as ceiling microphones, individual table microphones, and the like, can be used. The microphone pod 29 communicatively connects to the videoconferencing device 80 and captures audio for the videoconference. For its part, the device 80 can be incorporated into or mounted on a display and/or a videoconferencing unit (not shown).

Figure 1D:
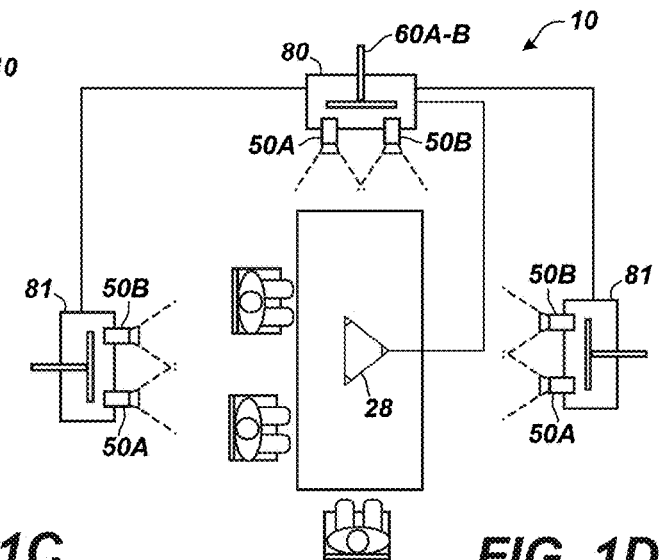

FIG. 1D shows a plan view of another arrangement of the endpoint 10. Here, the endpoint 10 has several devices 80/81 mounted around the room and has a microphone pod 29 on a table. One main device 80 has microphone arrays 60A-B and two cameras 50A-B as before and can be incorporated into or mounted on a display and/or videoconferencing unit (not shown). The other devices 81 couple to the main device 80 and can be positioned on sides of the videoconferencing environment.

The auxiliary devices 81 at least have a people-view camera 50B, although they can have a room-view camera 50A, microphone arrays 60A-B, or both and can be the same as the main device 80. Either way, audio and video processing described herein can identify which people-view camera 50B has the best view of a speaker in the environment. Then, the best people-view camera 50B for the speaker can be selected from those around the room so that a frontal view (or the one closest to this view) can be used for conference video.

Figure 1E:
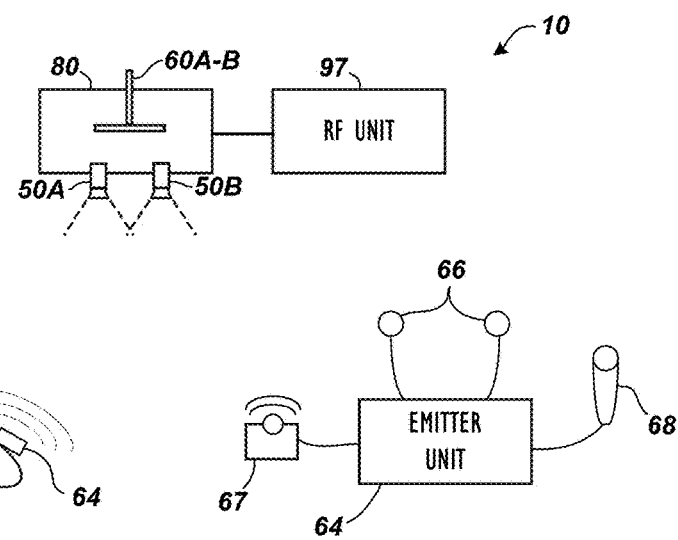

In FIG. 1E, another arrangement of the endpoint 10 includes a videoconferencing device 80 and a remote emitter 64. This arrangement can be useful for tracking a speaker who moves during a presentation. Again, the device 80 has the cameras 50A-B and microphone arrays 60A-B. In this arrangement, however, the microphone arrays 60A-B are responsive to ultrasound emitted from the emitter 64 to track a presenter. In this way, the device 80 can track the presenter as he/she moves and as the emitter 64 continues to emit ultrasound. In addition to ultrasound, the microphone arrays 60A-B can be responsive to voice audio as well so that the device 80 can use voice tracking in addition to ultrasonic tracking. When the device 80 automatically detects ultrasound or when the device 80 is manually configured for ultrasound tracking, then the device 80 can operate in an ultrasound tracking mode.

As shown, the emitter 64 can be a pack worn by the presenter. The emitter 64 can have one or more ultrasound transducers 66 that produce an ultrasound tone and can have an integrated microphone 68 and a radio frequency (RF) emitter 67. When used, the emitter unit 64 may be activated when the integrated microphone 68 picks up the presenter speaking. Alternatively, the presenter can actuate the emitter unit 64 manually so that an RF signal is transmitted to an RF unit 97 to indicate that this particular presenter will be tracked.

Figure 2A:
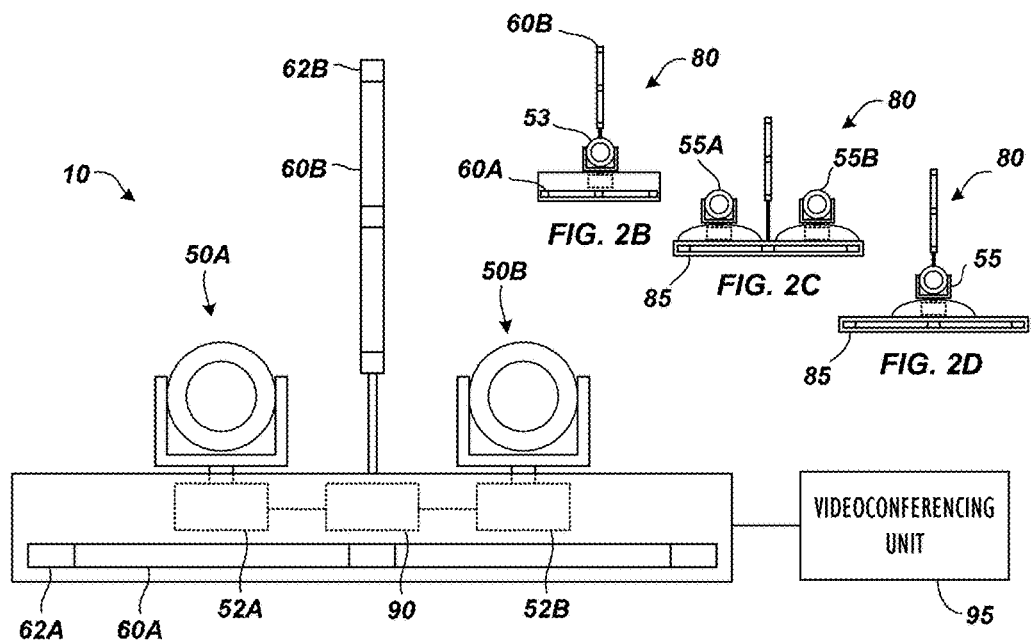
FIG. 2A shows a videoconferencing device for an endpoint according to the present disclosure.

Before turning to operation of the endpoint 10 during a videoconference, discussion first turns to details of a videoconferencing device according to the present disclosure. As shown in FIG. 2A, a videoconferencing device 80 has a housing with a horizontal array 60A of microphones 62A disposed thereon. Extending from this housing, a vertical array 60B also has several microphones 62B. As shown, these arrays 60A-B can each have three microphones 62A-B, although either array 60A-B can have a different number than depicted.

The first camera 50A is the room-view camera intended to obtain wide or zoomed-out views of a videoconference environment. The second camera 50B is the people-view camera intended to obtain tight or zoomed-in views of videoconference participants. These two cameras 50A-B are mounted on the housing of the device 80 and can be integrated therewith. The room-view camera 50A has image processing components 52A that can include an actuator if not an EPTZ camera. The people-view camera 50B also has image processing components 52B that include an actuator to control the pan-tilt-zoom of the camera's operation. These components 52A-B can be operatively coupled to a local control unit 90 housed in the device 80.

For its part, the control unit 90 can include all or part of the necessary components for conducting a videoconference, including audio and video modules, network module, camera control module, etc. Alternatively, all or some of the necessary videoconferencing components may be housed in a separate videoconferencing unit 95 coupled to the device 80. As such, the device 80 may be a stand-alone unit having the cameras 50A-B, the microphone arrays 60A-B, and other related components, while the videoconferencing unit 95 handles all of the videoconferencing functions. Of course, the device 80 and the unit 95 can be combined into one unit if desired.

Rather than having two or more integrated cameras 50A-B as in FIG. 2A, the disclosed device 80 as shown in FIG. 2B can have one integrated camera 53. Alternatively as shown in FIGS. 2C-2D, the device 80 can include a base unit 85 having the microphone arrays 60A-B, communication ports (not shown), and other processing components (not shown). Two or more separate camera units 55A-B can connect onto the base unit 85 to make the device 80 (see FIG. 2C), or one separate camera unit 55 can be connected thereon (see FIG. 2D). Accordingly, the base unit 85 can hold the microphone arrays 60A-B and all other required electronic and signal processing components and can support the one or more camera units 55 using an appropriate form of attachment.

Although the device 80 has been shown having two cameras 50A-B situated adjacent to one another, either one or both of the cameras 50A-B can be entirely separate from the device 80 and connected to an input of the housing. In addition, the device 80 can be configured to support additional cameras instead of just two. In this way, users could install other cameras, which can be wirelessly connected to the device 80 and positioned around a room, so that the device 80 can always select the best view for a speaker. It will be apparent to a person of skill in the art that other configurations are possible which fall within the scope of the appended claims.

Figure 3:
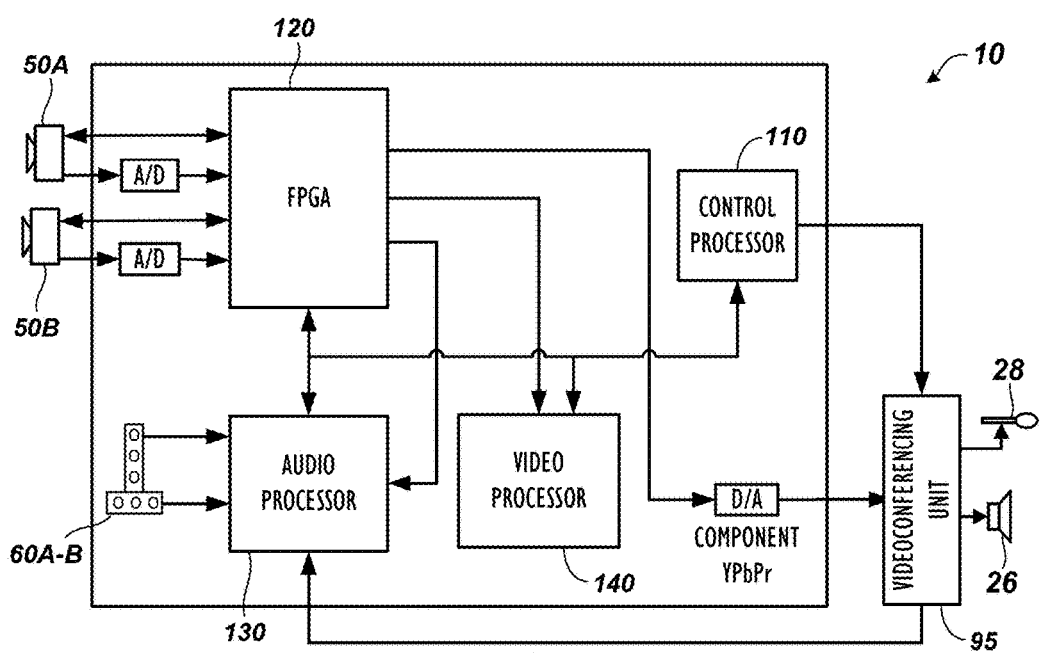
FIG. 3 illustrates components of the videoconferencing device of FIGS. 2A-2D.

FIG. 3 briefly shows some exemplary components that can be part of the device 80 of FIGS. 2A-2D. As shown, the device 80 includes the microphone arrays 60A-B, a control processor 110, a Field Programmable Gate Array (FPGA) 120, an audio processor 130, and a video processor 140. As noted previously, the device 80 can be an integrated unit having the two or more cameras 50A-B integrated therewith (See FIG. 2A), or these cameras 50A-B can be separate units having their own components and connecting to the device's base unit (See FIG. 2C). In addition, the device 80 can have one integrated camera (53; FIG. 2B) or one separate camera (55; FIG. 2D).

During operation, the FPGA 120 captures video inputs from the cameras 50A-B, generates output video for the videoconferencing unit 95, and sends the input video to the video processor 140. The FPGA 120 can also scale and composite video and graphics overlays. The audio processor 130, which can be a Digital Signal Processor, captures audio from the microphone arrays 60A-B and performs audio processing, including echo cancellation, audio filtering, and source tracking. The audio processor 130 also handles rules for switching between camera views, for detecting conversational patterns, and other purposes disclosed herein.

The video processor 140, which can also be a Digital Signal Processor (DSP), captures video from the FPGA 120 and handles motion detection, face detection, and other video processing to assist in tracking speakers. As described in more detail below, for example, the video processor 140 can perform a motion detection algorithm on video captured from the people-view camera 50B to check for motion in the current view of a candidate speaker location found by a speaker tracking algorithm. A speaker tracking algorithm can include one or more algorithms as detailed below. This can avoid directing the camera 50B at reflections from walls, tables, or the like, (see FIG. 8). In addition, the video processor 140 can use a face-finding algorithm to further increase the tracking accuracy by confirming that a candidate speaker location does indeed frame a view having a human face.

The control processor 110, which can be a general-purpose processor (GPP), handles communication with the videoconferencing unit 95 and handles camera control and overall system control of the device 80. For example, the control processor 110 controls the pan-tilt-zoom communication for the cameras' components and controls the camera switching by the FPGA 120.

Figure 4:
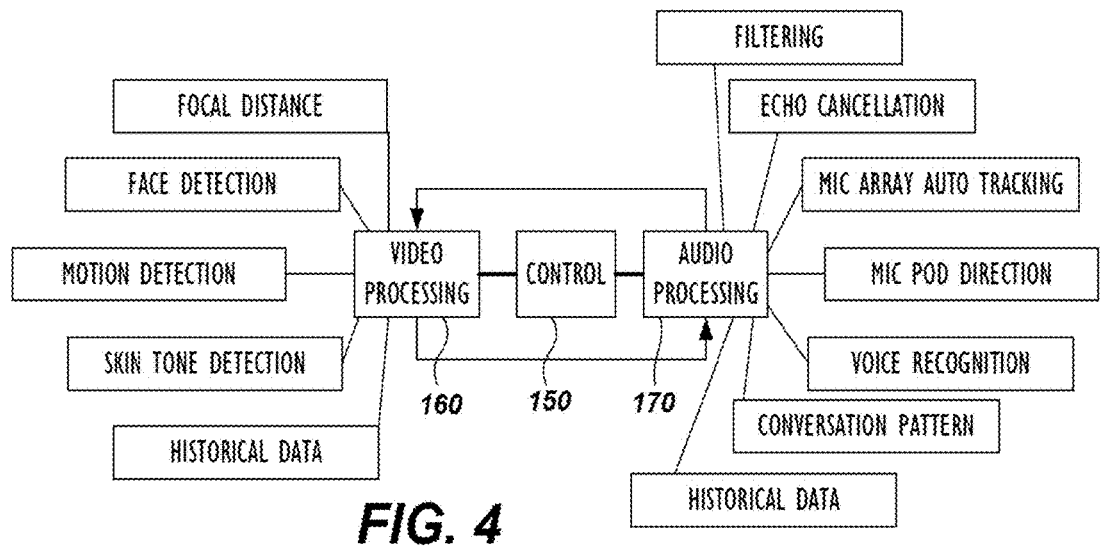
FIG. 4 illustrates a control scheme for the disclosed endpoint using both audio and video processing.

With an understanding of the videoconferencing endpoint and components described above, discussion now turns to operation of the disclosed endpoint 10. First, FIG. 4A shows a control scheme 150 used by the disclosed endpoint 10 to conduct a videoconference. As intimated previously, the control scheme 150 uses both video processing 160 and audio processing 170 to control operation of the cameras 50A-B during the videoconference. The processing 160 and 170 can be done individually or combined together to enhance operation of the endpoint 10. Although briefly described below, several of the various techniques for audio and video processing 160 and 170 are discussed in more detail later.

Briefly, the video processing 160 can use focal distance from the cameras 50A-B to determine distances to participants and can use video-based techniques based on color, motion, and facial recognition to track participants. As shown, the video processing 160 can, therefore, use motion detection, skin tone detection, face detection, and other algorithms to process the video and control operation of the cameras 50A-B. Historical data of recorded information obtained during the videoconference can also be used in the video processing 160.

For its part, the audio processing 170 uses speech tracking with the microphone arrays 60A-B. To improve tracking accuracy, the audio processing 170 can use a number of filtering operations known in the art. For example, the audio processing 170 preferably performs echo cancellation when performing speech tracking so that coupled sound from the endpoint's loudspeaker is not be picked up as if it is a dominant speaker. The audio processing 170 also uses filtering to eliminate non-voice audio from voice tracking and to ignore louder audio that may be from a reflection.

The audio processing 170 can use processing from additional audio cues, such as using a tabletop microphone element or pod (29; FIG. 1). For example, the audio processing 170 can perform voice recognition to identify voices of speakers and can determine conversation patterns in the speech during the videoconference. In another example, the audio processing 170 can obtain direction (i.e., pan) of a source from a separate microphone pod 29 and combine this with location information obtained with the microphone arrays 60A-B. Because the microphone pod (29) can have several microphones (28) positioned in different directions, the position of an audio source relative to those directions can be determined.

When a participant initially speaks, the microphone pod 29 can obtain the direction of the participant relative to the microphone pod 29. This can be mapped to the participant's location obtained with the arrays 60A-B in a mapping table or the like. At some later time, the microphone pod 29 may detect a current speaker so that only its directional information is obtained. However, based on the mapping table, the endpoint 10 can locate the current speaker's location (pan, tilt, zoom coordinates) for framing the speaker with the camera using the mapped information.

Figure 5:
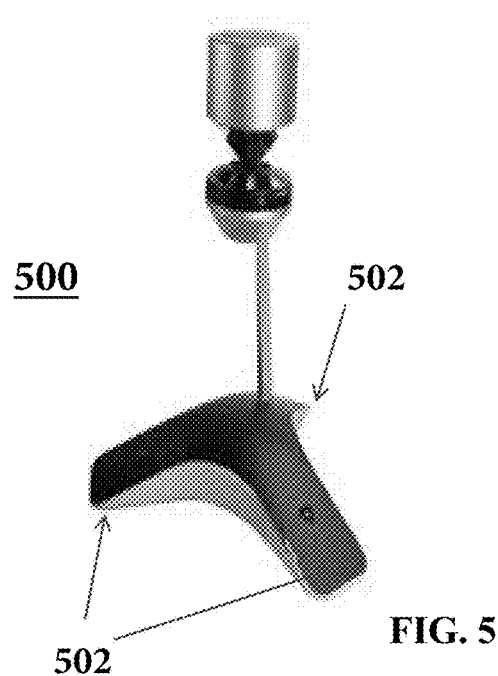
FIG. 5 illustrates a tabletop videoconferencing apparatus in accordance with certain aspects of the instant disclosure.

With the foregoing explanation in mind, discussion now turns operations and methods involving a teleconferencing apparatus, such as pod 29. An example embodiment of a teleconferencing apparatus 500 (29) is illustrated in FIG. 5. Teleconferencing apparatus 500 (29) can include three microphones 502 (28) as shown. As noted above, it can be desirable to display a person who is talking in an active talker window in high definition, to make the teleconferencing experience feel more real for participants. In order for the system 10 to display the active talker view in high definition resolution, the talker's position needs to be localized first. This is a very challenging task in the meeting room environment due to various head orientations, noises, wall reflections, etc. Microphones 502 (28) of teleconferencing apparatus 500 can be used to localize an active talker. It will be noted that rather than locating an active talker in just a 180 degree plane, the methods and systems of this disclosure can quickly localize an active talker from within a 360-degree plane, (see FIGS. 6 and 13).

Figure 6:
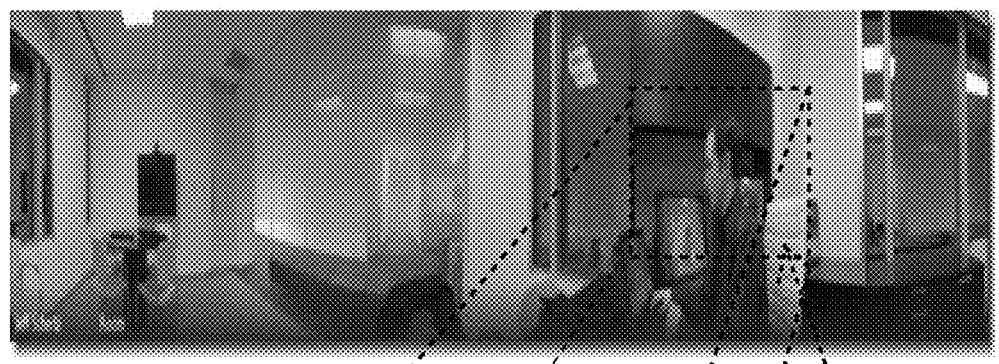
FIGS. 6-7 illustrate the views of a tabletop videoconferencing apparatus as illustrated in FIG. 5, including a whole-room panoramic view and a high definition active speaker view.
Figure 7:
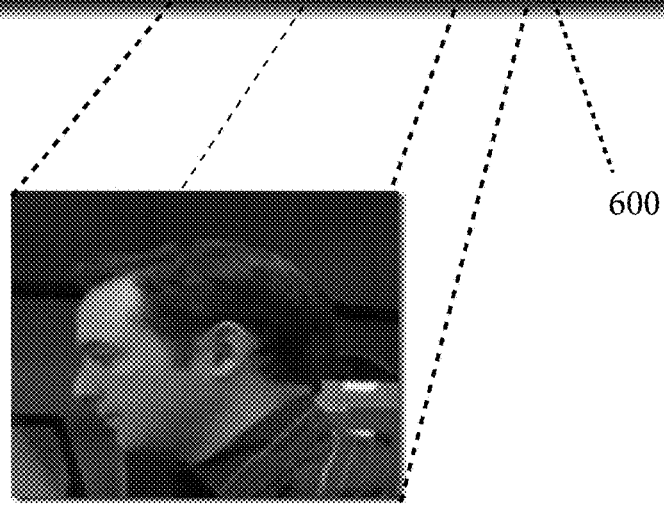

FIGS. 6-7 illustrate the views of a tabletop videoconferencing system as illustrated in FIG. 5, including a whole-room panoramic view and a high definition active speaker view According to one embodiment of this disclosure, audio information in a teleconferencing session is to produce several candidate angles corresponding to the direction of sound arriving from a talker. These angles may include the true angle (i.e., the direct path) of the talker, and one or more false angles due to sound reflections and the like. This process is done continually (and/or iteratively) throughout a session, since people can change locations and different people will speak. Video motion can be used to help determine which angle out of the candidate angles is the true angle of the talker. The active talker 600 (see FIG. 6) is then displayed in an active talker window 700 (see FIG. 7) in high definition, in order to enable participants to better appreciate and understand what the active talker 600 is saying.

Candidate angles can be obtained by applying a unique circular microphone array-processing algorithm to the three built-in Cardioid microphones 502 (28), as illustrated in FIG. 5. In addition to relying on the phase information of microphone signals, the microphone array algorithm as disclosed can also utilize the magnitude information at each frequency so that sound information is both spectrally-weighted and spatially-weighted.

Figure 8:
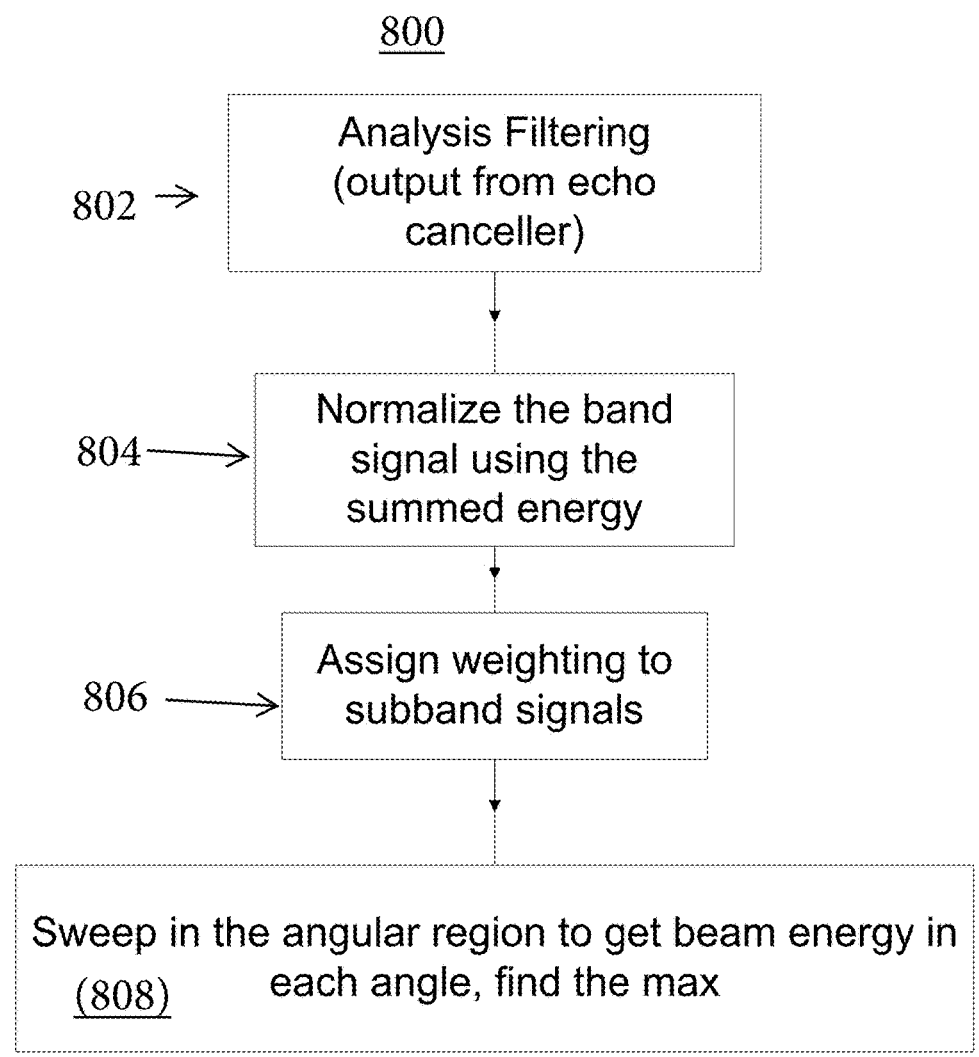
FIG. 8 illustrates a block diagram of an audio processing algorithm applicable to certain aspects of the instant disclosure.

At least one benefit of this weighting scheme is that allows for a reduction in the minimal number of microphones required for the algorithm to work effectively. Thus the apparatus requires only three microphones. A block diagram of one such algorithm is shown in FIG. 8. Such an algorithm 800 can also be computationally efficient if implemented in the frequency-domain (more specifically, in the subband domain). Algorithm or method 800 can begin at block 802 conducting filter analysis of signals received in a relevant period. Once this analysis is completed, the method can continue to block 804, in which the band signals are normalized using the summed energy of the subbands in question. After block 804, the method can proceed to block 806, in which the subbands making up the signal in question are weighted according to the scheme disclosed herein. After block 806 is complete, audio beam energy at each angle is calculated at block 808. The angle which has the greatest energy, becomes the best estimated angle for that particular audio frame (ten milliseconds or twenty milliseconds, for example). Information at the estimated angle is then accumulated over some integration time (two seconds, for example). In the example shown, up to four candidate angles are produced after the post-processing such as clustering/moving average over the integration time. However, other numbers of candidate angles in other possible embodiments. The candidate angles can be further evaluated with regard to motion data, as described herein, to confirm the accuracy of the determination.

It will be understood to persons of skill in the art that the algorithm 800 enables the elevation (or tilt) of talking persons using only three horizontal microphones. This can be especially useful for detecting talkers who sit or stand very close to the device 500.

The following is an example of a normalization and weighting function, (see FIG. 8):

$$\text{Normalize\_Weighting}[j] = \frac{\text{HIGH\_LIM} - j}{\text{SumMicPower}[j]}$$

The normalization and weighting function above can be applied to all microphone signals in beamforming. "j" is the subband index, which can be interpreted as frequency, for ease of understanding and application. HIGH_LIM is the total number of subbands making up a band being analyzed. Although the normalization and weighting function is relatively simple, it is powerful in its application. The function involves both frequency-weighting (explicitly) and spatial-weighting (implicitly). An important aspect is that the lower frequencies are weighted more heavily than higher frequencies. This weighting scheme enhances the accuracy with localization of an active talker, even in the extreme case when he or she is facing away from teleconferencing apparatus 500 when speaking.

SumMicPower[j] is used to equalize the speech signal in the frequency domain. The spectrum of speech signal is not flat, thus this term aims to balance the contributions in beamforming from high-energy frequencies and low-energy frequencies. SumMicPower[j] is the sum of the signal power from all microphones in the jth subband, and thus SumMicPower[j]=Mic0_Power[j]+Mic1_Power[j]+Mic2_Power[j] in this case. It is noted that no phase is taken into account, and only magnitude information is used.

A more detailed version of the above beamforming function is shown below:

BeamFormingPower[j]=(SignalPowerOf_Mic_0[j]
*CorrespondingPhaseCompenstation_For_Mic0
[j]+SignalPowerOf_Mic_1[j]*Corresponding-
PhaseCompenstation_For_Mic1[j]+
SignalPowerOf_Mic_2[j]
*CorrespondingPhaseCompenstation_For_Mic2
[j]+ . . . *Normalize_Weighting[j]

(where j is the subband index; subband 0: [zero to 50 Hz], subband 1: [50, 100 Hz], subband 2: [100, 150 Hz] . . . , and so on, for example.)

Figure 9:
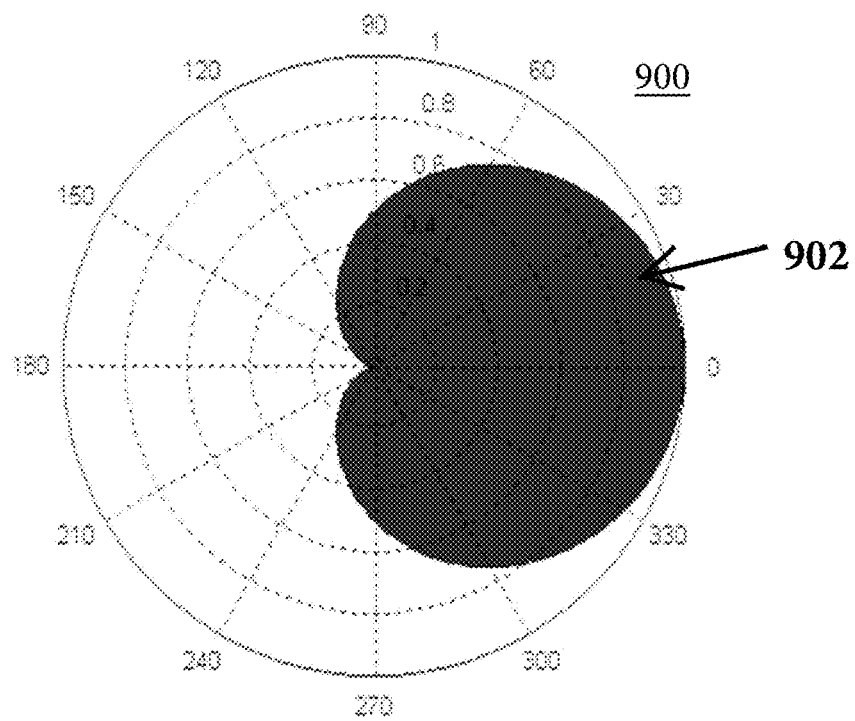
FIG. 9 illustrates is a plot of the directionality of a cardioid microphone of this disclosure.

The spatial-weighting aspect of the function is implicit. The microphones 502 are cardioid and have plot 902 illustrated in FIG. 9. The received signal is stronger (has a greater amplitude) when the speaker speaks directly into the microphone (zero degrees) and weakest when he or she speaks away from the microphone 502 (180 degrees). When the above function is applied to component microphones in a like manner, the directionality of each microphone plays an important role insofar as greater weight is inherently given to the direction of the stronger audio. This process thus implicitly weights the signals spatially.

Figure 10:
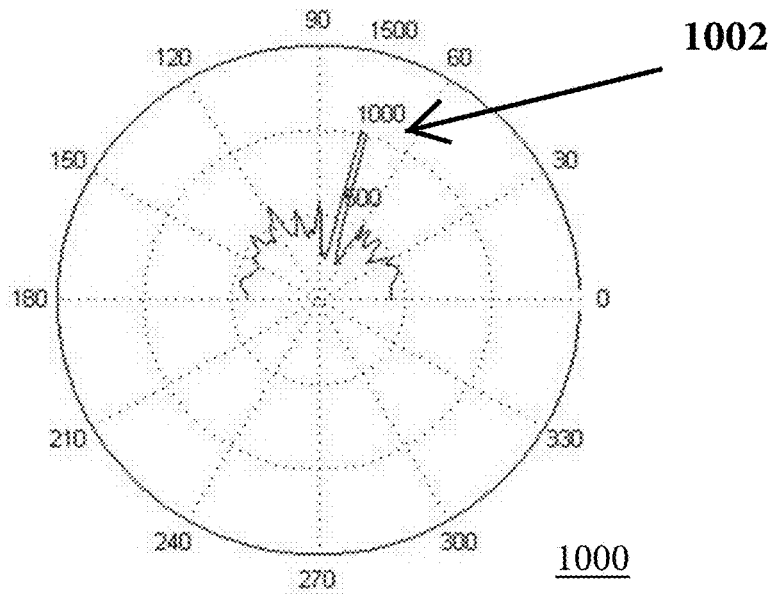
FIG. 10 illustrates a beamforming plot according to this disclosure.

FIG. 10 illustrates an example beamforming plot 1000 according to this disclosure. For ease of understanding, only a half-plane, 180 degree plot is shown. As illustrated beamforming takes the sum of all microphone signal energy while accounting for the phase of each signal. There is a peak 1002 visible in the plot 1000. It will thus be understood to persons of skill in the art, having considered this disclosure, that peak 1002 corresponds to the pan angle of a talker. When beamforming is performed, four possible tilt angles can be considered (zero degrees, fifteen degree, 30 degrees, 45 degrees, for example). Each tilt angle corresponds to a different "phase compensation" in beamforming as described in the paragraph immediately preceding the paragraph above. Thus, four plots similar to that of FIG. 10 would be rendered. The peak to average ratio for each plot is then calculated, the angle of tilt which has the greatest peak to average ratio is thus determined to be the best candidate angle of tilt.

As intimated above, video information is used to enhance the process of localizing an active talker. As noted above, video motion is an additional dimension of information that can be used to cover some difficult cases, such as people facing away from the device. In such cases, an audio-only localizer may fail because a reflected sound signal from such a participant may be stronger than the direct-path sound. The audio algorithm will tend to find the angle of the strongest audio signal, but analysis of video motion can eliminate false positives and help locate the correct ("true") angle, even if it does not correspond to the strongest signal (as determined using the algorithm above).

Most people tend move when they speak. Such motion can include lip movement, eye blinking, head/body movement, etc. Therefore, a true angle of a speaker can be chosen from among the candidate angles when the angle (+/−10 degrees, for example) is also associated with motion. In other words, the angles corresponding to the wall reflections can be ignored even if the magnitude and phase information from the audio portion of the algorithm causes them to be indicated as stronger signals. In at least one embodiment, by checking for motion at or near the candidate angle, the angle can be discounted if no motion is found at that angle.

Video motion can be computed in a variety of ways. In some embodiments, it can be computed by taking the absolute difference between two video frames of the 360-degree panoramic room view (say, 1056×144), time-spaced 160 milliseconds apart. Other resolutions or time spacing can also be used if desired or appropriate in a given embodiment. A pixel can be declared to be a motion pixel when the difference is greater than a predefined threshold. In other embodiments, motion vectors for particular pixels or blocks can be used, as well as other known motion detection algorithms.

Firstly, it must be understood that the motion information is analyzed in short periods, every two seconds for example. If motion is not detected corresponding to a candidate angle in that period, the candidate angle will be reconsidered. The motion data will also be stored for longer periods (15 or 30 seconds, for example). This is because while a person may not move in the shorter period, he or she will still tend to move in the longer period. The longer term motion can then be an indication that the detected audio is coming from the location of the motion. However, reliance on the longer term motion can be tempered by checking for motion in nearby regions during the same extended period. If motion is also detected in surrounding nearby regions, this is a strong indication that the detected motion is caused by motion of the camera itself. The results will thus be disregarded and the algorithm will be run again (as it would be in any case). This is because the device might shake occasionally causing the false video motion.

Figure 11:
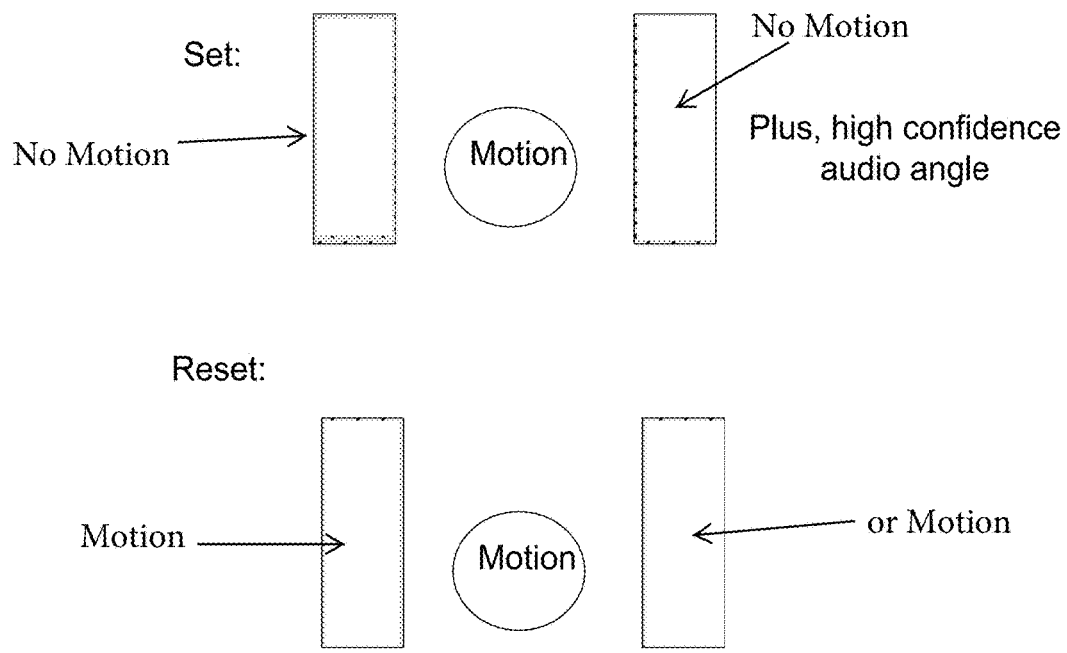
FIG. 11 illustrates self-defining pre-sets for use with certain motion-analysis algorithms disclosed herein.

Consider the situation where it has been determined that an active talker has been talking at a given angle for longer period of time. That candidate angle can still be considered a strong candidate to be a true angle, even if the above discussed algorithms would indicate that it is a less probable candidate in the most recent period, (two seconds, for example). If motion is detected at that angle, and motion is not detected in nearby regions (as illustrated in FIG. 11), the likelihood is that the angle corresponding to the motion is nevertheless correct. In contrast, even if motion is detected at that angle, if motion is also detected to the left or right of the angle, no additional weight will be given to that angle, and the rankings of the angles will be as discussed above. Thus, if a candidate angle had been consistently identified as a strong candidate angle, the candidacy of that angle can still be given great weight, even if not currently indicated as strong.

The same logic can be applied to the creation of self-defining "pre-sets." A pre-set can be defined when three conditions are satisfied: 1) there is motion at the angle; 2) there is no motion to the left and right of the angle; and 3) the determined audio angle has a high confidence level. When a person leaves the seat, he/she will leave to either the left or right of the seat (as perceived by the camera). So when condition #2 is violated, this preset position is reset, because the speaker may have moved. After a pre-set is defined, the camera can still point to this pre-set position even if the talker doesn't move.

The features of the speech signal for each pre-set can be calculated to improve the accuracy of the localizer. For instance, the camera can avoid pointing to a pre-set position by mistake if the talker's speech is detected to be significantly different from the speech stored for that preset position. The signal feature may include pitch, volume, MFCC (Mel Frequency Cepstral Coefficients) typically used for speaker identification, etc.

Figure 12:
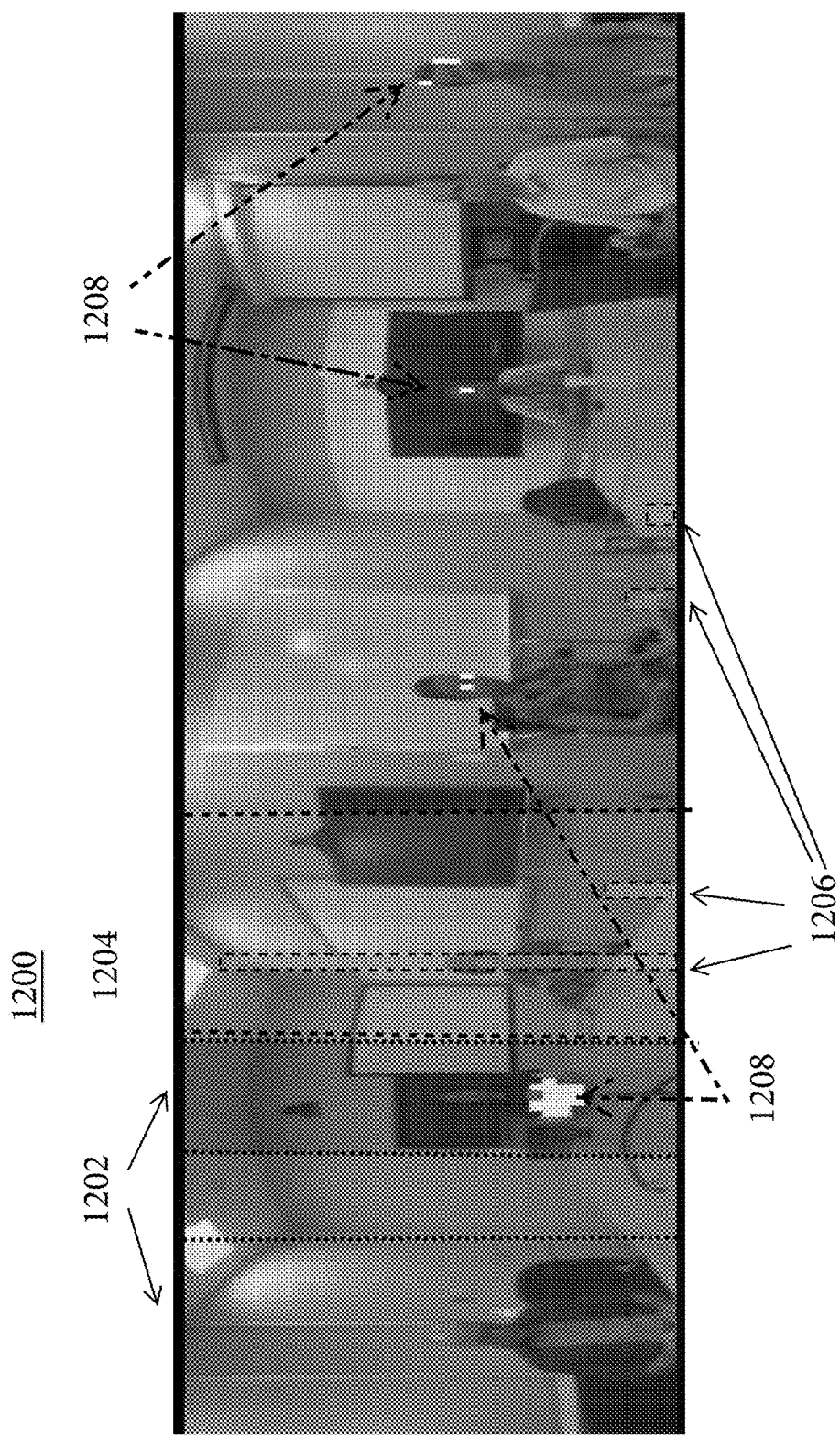
FIG. 12 illustrates a panoramic conference view with the motion regions, candidate angles, and presets superimposed thereon.

The information used in the above-described algorithms is visually demonstrated in the panoramic view 1200 of a typical meeting shown in FIG. 12. The regions 1202 correspond to preset regions. Region 1204 is the active talker view to be displayed in high definition. The bars 1206 are the candidate angles derived from the audio information. The white pixelated 1208 areas correspond to detected motion.

Figure 13:
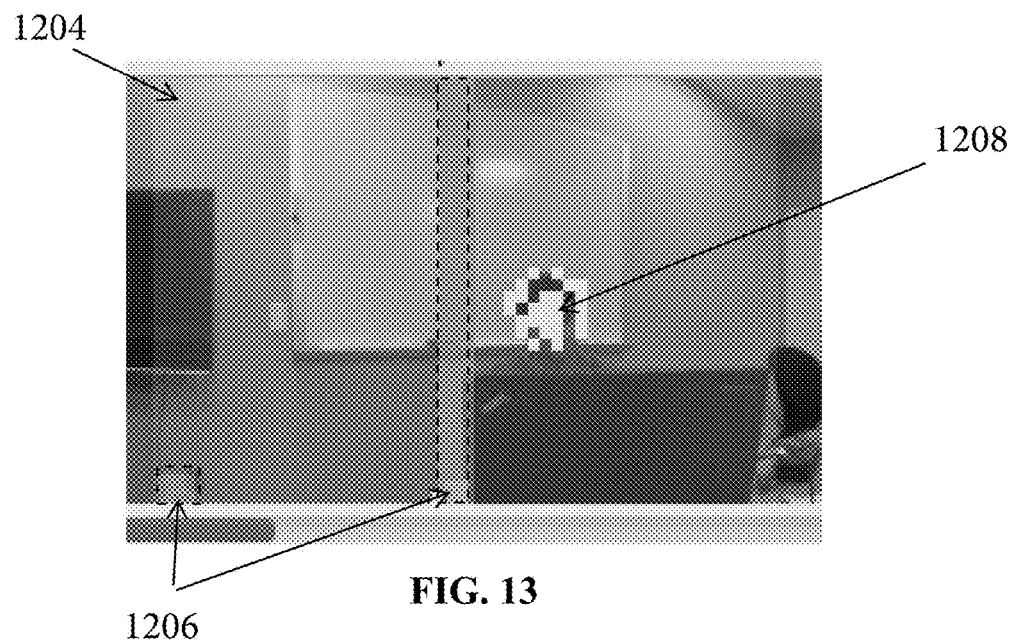
FIG. 13 illustrates an example implementation of a localization process for an active talker.

FIG. 13 illustrates the use of the video motion detector to center the active talker within an active talker view. The white pixels 1208 illustrate motion pixels, and bars 1206 are the audio angles. Region 1204 refers to the active talker view chosen for display in high definition resolution, (see FIG. 7). The more probable audio angle is off-center because the direct path of audio is partially blocked by the laptop PC monitor, causing the sound to go around the monitor from its side. However, using the motion pixels 1208, the location of the talker's head/face can be determined, and the video can be centered on the talker once the location and shape are confirmed to match the shape of a human head.

The technology of this disclosure can take the forms of hardware, or both hardware and software elements. In some implementations, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums as signal carriers per se are not included in the definition of physical computer-readable medium). Examples of a physical computer-readable medium include a semiconductor or solid state memory, removable memory connected via USB, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD, and Blu Ray™. A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem, WiFi, and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

The above description is intended to be illustrative, and not restrictive. For example, the above-described embodiments may be used in combination with each other. Many other embodiments will be apparent to those of skill in the art upon reviewing the above description.

The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method of localizing an active talker, the method comprising:
　receiving, using one or more microphones, audio information corresponding to one or more angles with respect to the one or more microphones;
　determining, from amongst the one or more angles, at least one candidate angle corresponding to a possible location of an active talker, using an algorithm which gives greater weight to lower frequency bands than to higher frequency bands from within the received audio information;
　receiving motion information;
　analyzing the candidate angle with respect to the received motion information; and
　determining whether the candidate angle indicates an active talker based, at least in part, on the analysis.

2. The method of claim 1, wherein the algorithm used to determine the at least one candidate angle is implemented in the frequency domain.

3. The method of claim 2, wherein the algorithm used to determine the at least one candidate angle is implemented in the sub-band domain.

4. The method of claim 1, wherein using one or more microphones comprises using a plurality of microphones, at least three of which are in a planar configuration.

5. The method of claim 4, wherein at least three of microphones within the plurality of microphones are at least partially housed within a base of a teleconferencing device.

6. The method of claim 5, wherein the teleconferencing device includes at least one camera configured to receive visual information in a 360-degree plane.

7. The method of claim 1, further comprising capturing the motion information using at least one camera configured to receive visual information in a 360-degree angle of rotation.

8. The method of claim 1, further comprising capturing the motion information using at least one cardioid camera.

9. The method of claim 1, wherein receiving audio information using one or more microphones comprises receiving audio information using three microphones.

10. A method of locating an active talker, the method comprising:
　receiving audio information using a predetermined number of microphones, the audio information corresponding to one or more angles with respect to the microphones with respect to a predetermined location;
　analyzing the received audio information according to at least one algorithm to determine at least one candidate angle, the candidate angle corresponding to a possible location of an active talker;
　receiving motion information from at least one camera; and
　analyzing the candidate angle with respect to the received motion information, wherein analyzing the candidate angle with respect to the received motion involves determining whether motion has been detected at the candidate angle within a predetermined period of time.

11. The method of claim 10, wherein the algorithm gives greater weight to lower frequency bands than to higher frequency bands from within the received audio information.

12. The method of claim 10, wherein analyzing the candidate angle with respect to the received motion further involves determining whether motion has been detected within a predetermined range of the candidate angle.

13. The method of claim 12, further comprising designating the candidate angle as the angle of the active talker when no motion has been detected within the predetermined range within a predetermined period.

14. The method of claim 12, wherein the predetermined range is plus or minus ten degrees of the candidate angle.

15. The method of claim 14, wherein the predetermined period is two milliseconds.

16. The method of claim 10, wherein at least one of the microphones is a cardioid microphone.

17. The method of claim 10, further comprising determining whether a view of a location corresponding to the candidate angle frames a face.

18. The method of claim 10, wherein receiving motion information comprises determining the absolute difference between two video frames captured 160 milliseconds apart.

19. The method of claim 18, wherein determining the absolute difference between two video frames captured 160 milliseconds apart comprises declaring at least one pixel to be a motion pixel when the absolute difference between the values of that pixel in the two video frames exceeds a predefined threshold.

* * * * *